Dec. 19, 1967  C. GOLDMAN  3,359,130
DOUBLE SHELLED FOAMABLE PLASTIC PARTICLES
Filed Nov. 12, 1963
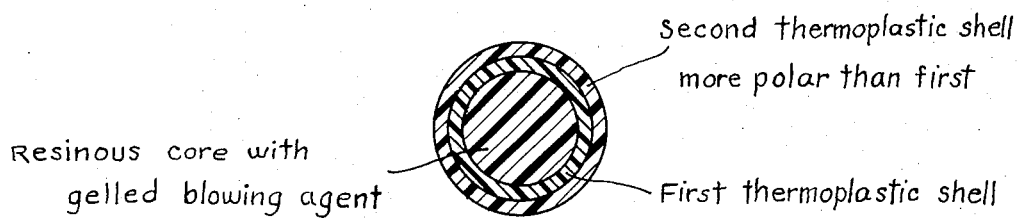

United States Patent Office 3,359,130
Patented Dec. 19, 1967

3,359,130
DOUBLE SHELLED FOAMABLE PLASTIC
PARTICLES
Conrad Goldman, Rochester, N.Y., assignor to Papex
Corporation, Rochester, N.Y., a corporation of
Delaware
Filed Nov. 12, 1963, Ser. No. 323,045
4 Claims. (Cl. 117—72)

The application is a continuation-in-part of my copending application, Ser. No. 225,829, filed Sept. 24, 1962, now abandoned, for Low Density Plastic Insulating Materials, in which methods for preparing foamed and foamable plastic powders containing cores of gelled blowing agent are described.

The present invention relates in general to the field of foamable plastic powders, and more particularly to particles comprising a core of gelled blowing agent, an inner shell of thermoplastic material and an outer shell of thermoplastic material, which is more easily fused than the inner shell.

In the pending application, the advantages disclosed for powdered material containing a core of gelled blowing agent over prior art were, that the blowing agent could be utilized at maximum efficiency and that the resin surrounding the core could be fused before foaming was initiated, by proper temperature and pressure control, as well as other advantages listed in the patent application. It is found that a powder particle comprising a core of gelled blowing agent, surrounded by a double shell of resin, in which the outer shell fuses at a lower temperature than the inner shell, has advantages over the single shelled foamable powder particle. These advantages include the ability to fuse foamed powder particles more readily; the minimizing of pressure requirements to prevent bursting of the foamed particles during fusion operations; the opportunity to introduce different physical properties in the two layers—to maintain adequate strength strength while improving cohesion of particle to particle and adhesion of particle to substrate; to improve fusibility; to introduce polar groups, enabling the utilization of Radio Frequency heating for fusion operation, as well as other beneficial properties.

An object of the present invention is to provide means for producing a foamable powder particle, comprising a core of gelled blowing agent, an inner shell of thermoplastic material and an outer shell of thermoplastic material having a lower fusion temperature range than that of the inner shell.

Another object of the invention is to produce a foamed powder, having a double shell, in which the two shells have different physical properties.

An additional object of the invention is to produce a double shelled foamed polymer particle that can be readily fused by RF heating techniques.

An object of the invention is to produce a foamed powder having a double shell, which can be readily fused into shaped objects, requiring minimum pressure control to prevent bursting of the foamed powder particles.

A further object of the invention is to process single shelled foamable powders, by chemical reaction, to produce a modified surface, enabling the modified foamable powder to be subsequently converted to finished products, having the processing characteristics and properties of material made from double shelled foamable powder particles.

In the drawing, the single view is a schematic representation, much enlarged, of a particle according to the present invention.

The methods that may be employed for producing double shelled foamable powder particles will depend in part, upon the physical properties desired in the inner shell, the outer shell, and the composite mass in general.

Although foamable powder, comprising a core of gelled blowing agent and a single shell of fusible resin may be modified by secondary processing, to yield pseudo "double-shelled" particles, it is preferred to produce the double shelled powder particles during the polymerization process.

By suitable choice of monomers and processing procedures, using graft polymerization and co-polymerization techniques, it is possible to produce foamable powders having a core of gelled blowing agent, an inner shell of fusible material and an outer shell of material having a lower fusion range than the inner shell. Modifications of this procedure, using polar monomers such as acrylonitrile, or halogenated styrene, will enable double shelled fusible powders to be produced, which will have unusual fusion charauteristics, depending on the co-monomers employed, and heating techniques subsequently utilized in fusion operations. As an example of the unusual polymer particles possible, the inner shell may consist of a non-polar thermoplastic, while the outer shell may be a more polar material having a higher softening range than the inner core. Using RF heating, during subsequent fusion processing, the outer shell will be preferentially heated, and will attain the fusion temperature of the polar material quite rapidly, while the inner shell of non-polar material will be little affected by the RF energy. The inner shell will be heated by the outer shell, by conduction. In effect, the double shelled foamable powder has behaved as though the outer shell consisted of a fusible polymer having a lower fusion range than the inner shell, and heating were performed by conduction.

Double shelled foamable powder may be produced by modified emulsion polymerization, suspension polymerization and solvent polymerization procedures, including modified graft polymerization and co-polymerization aspects of the above. In most instances, batch polymerization will enable suitable processing control to be readily attained, while in some polymer formulations, continuous polymerization procedures may be employed for parts, or the whole of a process. Since the polymer particles comprise three separate volume zones, each of which may be a homopolymer, copolymer, heteropolymer, or more complex polymer, the choice of raw material, and processing techniques employed in polymerizing specialty foamable polymers, can result in numerous products, having distinct and useful physical properties.

As examples of the types of polymer particles that may be produced by the present invention, an incomplete list is noted in Table I, for illustrative purposes.

TABLE I.—"FOAMABLE" POLYMER PARTICLES COMPRISING SEPARATE POLYMER "ZONES"

| Particle Structure | Polymer Types | | |
|---|---|---|---|
| | Core Zone | Inner Shell Zone | Outer Shell Zone |
| No. 1 | Homopolymer | Homopolymer | Homopolymer. |
| No. 2 | do | do | Copolymer. |
| No. 3 | Copolymer | do | Do. |
| No. 4 | do | Copolymer | Homopolymer. |
| No. 5 | do | do | Copolymer. |

Some generalized principles that have been employed in producing the double-shelled foamable polymer particles of the present invention, are briefly described below, for emulsion, suspension, and solvent polymerization techniques.

In creased reaction temperatures generally produces lower molecular weight polymers. Increased catalyst concentration produces lower molecular weight polymers in suspension and solvent polymerization, but generally produces higher molecular weight polymers in emulsion polymerization. In emulsion polymerization, increased soap concentration produces finer particle size. In solvent polymerization, increased concentration of solvent produces lower molecule weight polymers. With hydrolyzable monomers, alkalinity of the medium is to be minimized, for best conversion of monomer to polymer.

Since the physical properties of the foamable, or foamed double-shelled polymer particles will determine the end use applications, in which they may be satisfactorily utilized, and since these physical properties are directly related to the choice of monomers, catalysts, operating temperatures and related conditions for the formulations chosen, it is realized that close coordination between polymerization techniques, and end use requirements, can result in custom-tailoring of a variety of polymers, having specific and unique physical properties.

The end use applications in which the foamed, double-shelled polymer particles will find greatest potential, require that the polymerization process be oriented to produce material of controlled hardness, flexibility, cohesion, adhesion to substrates such as paper, metal-foil, textiles, plastic sheeting, and rigid surfaces; printability, chemical resistance, physical strength, and texture, amongst other properties found in plastic material.

As examples of the formulations and processing techniques that may be employed, in producing foamable double-shelled polymer particles, suitable for producing low density molded articles, or thin gauge, low density material in sheet, or shaped form, by modified powder-fusion, spray coating, oven sintering, and related techniques, some of which are disclosed in the co-pending application filed Sept. 24, 1962, under Ser. No. 225,829, the following are presented as illustrative examples of the present invention.

Considering the three zones of the particles produced in Table I, as the result of a "Series-Polymerization" process, and considering each zone as the product of an individual process, the details of the overall process can be more readily understood. The products of the present invention may be produced by conducting the "Series-Polymerization" process in a single reactor or kettle, in three successive batch processes, or the process may be conducted in a continuous manner, with three distinct reaction and feed zones. In addition, a semi-continuous process may be utilized, with certain raw materials, when producing specific double-shell products.

As a specific example of a process for producing foamable powder, substantially each particle of which comprises a volatile liquid-blowing agent concentrated in the core of the particle, and an inner and outer shell of thermoplastic material, in which the outer shell may be more readily fused than the inner shell, the following is cited.

In effect, the material produced may be considered an example of particle Structure No. 4 of Table I. The core zone may consist of an elastomer of butadiene and a co-monomer, capable of being solvated by an inert solvent such as pentane or heptane. The inner shell may be a copolymer of styrene and one of a group of co-reactants that will produce a copolymer having a higher distortion point than polystyrene itself and which will be insoluble in the core solvent. The outer shell may be essentially a homopolymer of polystyrene also insoluble in the liquid blowing agent, or a copolymer which is more readily fused (by RF heating) than the inner shell.

In preparing the polymers of the present invention, using batch processing, the core material may be polymerized, by emulsion technology, using the illustrative recipes noted below. When the reaction has progressed to 60 to 95% completion, as determined by analysis, the second phase of the series polymerization may be undertaken, adding the appropriate ingredients, according to the recipes for the inner shell zone, as noted below.

The "outer shell" zone may be polymerized onto the inner shell zone, which serves as a seed, or nucleus for the final particles, when the inner shell has been polymerized to 70–95% of completion, as determined an analysis. The finished product thus obtained when separated from the liquid medium will be foamable particles, comprising a core of gelled blowing agent, an inner shell of thermoplastic material, and an outer shell of thermoplastic material having physical properties such as softening point, and polarity, different to those of the inner shell. The times, temperatures, formulations and techniques employed will depend in part upon the physical and chemical properties desired in the finished product, and can be varied by those skilled in the art, without departing from the scope of the invention. It is also possible to utilize completely polymerized material in one phase of the series polymerization as a seed or nucleus for the next phase of polymerization, where catalysts in the latter phase serve to reactivate the seed material of the previous phase.

Continuous "Series-polymerization" may be effectively utilized, where flow rates, and reaction rates are coordinated, so that the proper degree of polymerization in one phase of the process is achieved, before the ingredients are added for the next phase of polymerization. Although the present invention deals primarily with polymers comprising thermoplastic material in controlled relative relationships, within the particles, it is possible, utilizing modified formulations and techniques, to produce foamable powders comprising a core of gelled volatile liquid blowing agents, an inner shell of Stage B thermoset material, and an outer shell of different Stage B thermoset material, or thermoplastic material.

The following recipes for producing double-shelled foamable thermoplastic powders are for illustrative purposes only, and the scope of the invention is not restricted to the examples cited.

CORE MATERIAL

*Recipe 1*

| | Parts by weight |
|---|---|
| Butadiene | 55 |
| Acrylonitrile | 45 |
| Ethylene dichloride | 50 |
| Hydrogen peroxide 3½% solution | 10 |
| Emulsifying solution (2% aqueous solution of myristic acid, 85% neutralized with NaOH) | 250 |
| Polymerization modifier: | |
|     Ferrous ammonium sulfate | 0.5 |
|     Levulinic acid | 0.5 |

At 30° C., the emulsion polymerization is 80% converted in 10 hours and 90% converted in 12 hours.

Recipe 2

| | Parts by weight |
|---|---|
| Butadiene | 75 |
| Styrene | 25 |
| Pentane | 50 |
| Water | 150 |
| Sodium diisobutyl naphthalene sulfonate | 3 |
| Sodium hydroxide | 0.2 |
| Potassium persulfate | 0.375 |
| Tolyl disulfide | 3.0 |

At 30° C., the emulsion polymerization is 90% converted in 5 hours.

Recipe 3

| | Parts by weight |
|---|---|
| Butadiene | 50 |
| Vinyl methylketone | 50 |
| Hexane | 50 |
| 5% solution of sodium oleate | 200 |
| Ammonium persulfate | 0.15 |
| Dodecyl mercaptan | 2.00 |

At 30° C., the emulsion polymerization is 80% converted in 48 hours.

INNER SHELL MATERIAL

Recipe 4

| | Parts by weight |
|---|---|
| Styrene | 95 |
| Acrylic acid nitrile | 5 |
| Hydrogen peroxide (30%) | 2 |
| Water (from core zone emulsion) | (¹) |
| Emulsifying agent | 2 |
| Mercaptan modifier | 0.5 |

¹ Water—as required, to obtain the desired solids ratios in the various zones.

At 30° C., 90% conversion will be achieved in 12 hours.

Recipe 5

| | Parts by weight |
|---|---|
| Styrene | 90 |
| 1,2-dicyano-1-methylethylene | 10 |
| Water (from core zone emulsion) | (¹) |
| Disodium phosphate | 3 |
| Citric Acid | 0.8 |
| Potassium persulfate | 0.04 |
| Emulsifier | 5.00 |

¹ See footnote 1 under Recipe 4.

At 30° C., 90% conversion will be achieved in 6 hours; at reflux 90% conversion will be achieved in 1 hour.

Recipe 6

| | Parts by weight |
|---|---|
| Styrene | 95 |
| Fumarodinitrile | 5 |
| Water (from core zone emulsion) | (¹) |
| Disodium phosphate (to pH 6) | (¹) |
| Sodium lauryl sulfate | 5.0 |
| Sodium perborate | 0.3 |

¹ See footnote 1 under Recipe 4.

At 35° C. the polymerization can be carried to 95% completion, in a matter of hours.

OUTER SHELL FORMULATION

Recipe 7

| | Parts by weight |
|---|---|
| Styrene | 100 |
| Sodium oleate | 3 |
| Potassium perborate | 1 |
| Water (from inner core emulsion) | (¹) |

¹ See footnote 1 under Recipe 4.

At 60° C., 60% conversion will be achieved in 1 hour.

Recipe 8

| | Parts by weight |
|---|---|
| Acrylic acid nitrile | 100 |
| Sodium palmitic-sulphonic acid | 0.6 |
| Marseilles soap | 0.6 |
| Water (from inner core emulsion) | (¹) |
| Hydrogen peroxide (30%) | 3.0 |

¹ See footnote 1 under Recipe 4.

At 70° C., the conversion is essentially complete within 4 hours.

Recipe 9

| | Parts by weight |
|---|---|
| Acrylic nitrile | 95 |
| Chlor-ethyl-triphosphoric ester | 5 |
| Benzoyl peroxide | 0.5 |
| Water (from inner core emulsion) | (¹) |
| Turkey red oil | 1.0 |
| Sodium iso-butyl naphthalene sulphonate | 0.5 |

¹ See footnote 1 under Recipe 4.

Polymerizing between 70–90° C., the reaction is substantially converted in four hours.

In order to better control the foaming characteristics of the polymer, it may be desirable to modify the core zone formulations. The use of gelled volatile liquid blowing agents, formed in situ, or dispersed in the monomers used in the core zone recipes, will in many cases provide means, by which the volatility of the blowing agent and the rate of foaming may be suitably and conveniently controlled. Methods for preparing gelled volatile liquid blowing agents have been outlined in the co-pending patent application, Ser. No. 225,829, and include combinations that are useful in the present disclosure.

It is realized that those skilled in the art may substitute various ingredients within the formulations, to alter reaction rates, molecular weight ranges and other physical and chemical properties of the products produced, within the scope of the invention, to produce various modifications of the cited examples.

The formulations for the inner zone may be so chosen, that the material will fuse at a higher temperature than polystyrene of conventional commercial grade qualities for reasons described earlier. Copolymers of styrene and minor amounts of monomer selected from the group consisting of acrylonitrile, fumaronitrile, para-chloro-alpha-methylstyrene, phenyl vinyl acetate, or divinyl benzene, trimethallyl phosphate and tung oil serve this purpose. Using homopolymers of styrene, or other thermoplastic forming monomers, which produce polymers having a softening range lower than that of the material used in the inner zone of the composite particles, will permit foamable powders to be produced according to one embodiment of the invention. According to a second embodiment of the invention, where radio frequency heating of foamed polymer particles is to be utilized for forming the powders into a web or shaped article, it will be advantageous to utilize recipes in the inner core zone that produce polymers that are not directly heated by radio frequency fields, such as homopolymers of styrene, and to utilize polar polymers, such as polyacrylonitrile, or copolymers possessing polar groups, that are more easily heated by RF currents, in the outer zone. Examples of such copolymers include copolymers of styrene and para-chloro-alpha-methylstyrene, styrene and chloroethylene, styrene and methacrylonitrile, and styrene and chlorinated styrene. These latter polar polymers may possess softening ranges similar to those of the inner zone, or h:gher than those of the inner zone, and still function satisfactorily, according to the embodiments of the invention, where the outer zone may be induced to preferentially be heated by RF heating, prior to heating of the inner zone.

It will be observed, that the recipes for the inner zone and outer zone may in some instances be interchanged, or independently varied, to produce satisfactory properties, according to the embodiments of the invention, depending upon the heating techniques, such as infra-red, thermal conduction, or R.F. heating, that will be employed in converting the polymer powders, to consumer goods.

The proportions of the recipes used to prepare the double shelled polymer products may be adjusted to obtain the desired combination of physical properties, for a particular end product. Table II cites illustrative examples, having useful properties.

TABLE II

| Example | Recipe No. | Zone | Weight, Parts | Polymer Particle, percent | Reaction Time, Hrs. | Temp., °C. |
|---|---|---|---|---|---|---|
| A | 1 | Core | 54.8 | 20 | 10 | 30 |
|  | 7 | Inner shell | 73.0 | 70 | 1 | 60 |
|  | Water |  | 52.0 |  |  |  |
|  | 9 | Outer shell | 10.2 | 10 | 4 | 90 |
|  | Water |  | 10.0 |  |  |  |
| B | 2 | Core | 20.4 | 10 | 5 | 30 |
|  | 7 | Inner shell | 78.0 | 75 | 1 | 60 |
|  | Water |  | 71.3 |  |  |  |
|  | 9 | Outer shell | 15.3 | 15 | 4 | 90 |
|  | Water |  |  |  |  |  |
| C | 2 | Core | 10.2 | 5 | 5 | 30 |
|  | 7 | Inner shell | 67.7 | 65 | 1 | 60 |
|  | Water |  | 61.5 |  |  |  |
|  | 9 | Outer shell | 30.6 | 30 | 4 | 90 |
|  | Water |  | 30.0 |  |  |  |

The following example serves to illustrate a pilot plant scale operation, where various size kettles and ancillary equipment are available.

EXAMPLE A 548 pounds of core material, according to Recipe 1 is reacted in a 100 gallon kettle, which is jacketed for heating and cooling, and equipped for refluxing and stirring. The recipe is reacted with stirring at 30° C. for 10 hours, at which time it will be approximately 80% converted. To a 300 gallon pressurized kettle, which is jacketed and equipped with stirring, is added 730 pounds of Inner Shell material according to Recipe 7, plus 520 pounds of water. The reacted core material from the 100 gallon kettle is transferred to the 300 gallon kettle, and the combined mass is heated to 60° C., with stirring for one hour. Adequate pressure is maintained to prevent the volatile solvent in the core material from boiling, as the temperature is now raised to 90° C., while the material for the outer shell, according to Recipe 9 is added in the amount of 102 pounds. An additional 100 pounds of water is added, to adjust the solids contents of the emulsion to approximately 50% polymer, and the entire mass is reacted an additional 4 hours, with stirring, at 90° C.

As another specific example of the invention, the same procedures above indicated in Example A may be followed, except that the formulation or recipe for each part of the mixture, the proportion of each ingredient, and the reaction times and temperatures and other factors are those respectively indicated in connection with Example B in foregoing Table II. A third specific example may use the same procedures as in Example A, but with the respective recipes or formulations, proportions of parts, reaction times, temperatures, etc., as indicated for Example C in Table II.

The material may be further processed according to the disclosure to yield foamed or foamable double shelled polymer particles. A preferred method of processing the hot emulsion to a foamed powder, comprises the heating of the emulsion in a pressurized heat exchanger, wherein the polymer particles are heated above the fusion point, and prevented from premature foaming by the use of pressures within the chamber, in excess of the boiling point of the volatile liquid used as blowing agent, contained in the core of the polymer particles; the fused unfoamed polymer particles being transported through the heat exchanges as discrete particles, by virtue of the water phase surrounding each particle, and then subjected to a flash evaporation of the water phase, with simultaneous foaming of the polymer particles, at pressures below the vapor pressure of the blowing agent. The low density foamed polymer particles may be collected by conventional cyclone separators, or similar equipment. The foamed polymer particles from the cyclone separator may be processed into finished articles, according to the disclosures in the co-pending application, Ser. No. 172,413, filed Feb. 12, 1962, now abandoned and replaced by a continuation-in-part application, Ser. No. 549,751, filed Apr. 20, 1966. One embodiment of the above disclosure provides that the foamed polymer particles are applied to a continuous belt by electrostatic techniques, and transported through a continuous belt oven maintained at 300–400° F., wherein the particles are raised above their fusion point, of approximately 220° F., in a matter of 0.5 to 5 seconds, depending upon the rate of speed of the belt through the oven, the oven temperature, the particle size range of the polymer, the type of polymer and the thickness of the layer of polymer particles being fused into a continuous web. The continuous web may be oriented to improve the physical strength characteristics, cooled to room temperature, and wound into rolls, for use as packaging material. The continuous web may be embossed, printed, laminated to various substrates or otherwise treated as an integral part of the above process, or it may be converted to finished goods at a later date.

The proportions of the recipes used in the core zone, inner zone, and outer zone, may be varied over wide limits. Many useful polymer powders may be produced, in which the core zone comprises 5–20% of the total polymer particles, the inner zone 50–90% and the outer zone 5–30% of the total. In order that these proportions be obtained during the series polymerization steps of the process, the percentage of the recipes utilized (and the amount of water added) should be suitably chosen.

Although the disclosure deals mainly with the emulsion polymerization procedures for producing the desired polymers, other polymerization procedures may be effectively employed. By controlling the type and concentration of emulsifiers and suspending agents the polymerization of the inner shell zone may be carried out as a suspension polymerization process, to control particle size and ease of separation of polymer from the liquid phase. The polymerization of the core zone may be carried out as a solvent polymerization process, in which the elastomer comprises 20–70% of the solution, and in which the solvent may serve as the volatile liquid blowing agent in subsequent processing of the final product; the incompletely reacted elastomer solution, being emulsified as described above. A further modification, within the scope of the invention, comprises dispersing or emulsifying a solution of elastomeric material into the inner shell zone recipe, for graft polymerization of the inner shell zone onto the elastomer-blowing agent as a core, and continuing the series polymerization as disclosed above. The elastomeric solution may contain therein, a dispersion of gelling agent, as outlined in the co-pending application, Serial No. 225,829, to effectively modify the rate of release of the volatile liquid hydrocarbon, during subsequent spray-foaming of the polymer particles. The polymerized foamable double shelled polymer particles may be post-treated in a "fluid extruder"; wherein the polymer particles are heated, in the emulsion phase, above the softening point of the resin, while sufficient pressure is maintained to prevent foaming of the volatile liquid hydrocarbon contained in the core of each polymer particle. A pressurized heat exchanger may serve as a fluid extruder. The heated emulsion, under pressure, when subjected to the action of a spray dryer, wherein the pressure, when subjected to the action of a spray dryer, wherein the pressure is maintained below the vapor pressure if the volatile liquid hydrocarbon, will lose the liquid phase of evaporation, and will produce foamed powder, by the combined action of the blowing effect of the volatile liquid hydrocarbon, and the process conditions within the spray dryer, acting upon the resin particles. With proper choice of temperature and pressure within the spray dryer, the evaporation, or wet bulb effect will cool the particle from its entering temperature to a considerably lower temperature, while the liquid phase of the polymer emulsion is being removed. In most cases, this will provide sufficient cooling, so that the polymer particles, when foamed, will be below their softening range, and may be conveniently collected, without coalescence or agglomeration; however, where necessary or desirable, additional cooling may be provided, to enable the polymer particles to be adequately cooled, before product recovery is made.

Instead of "spray-foaming" the emulsion, to obtain powders, the emulsion may be processed to yield foamable powders, by separating the polymer from the aqueous phase, in the spray chamber, under conditions that prevent foaming of the polymer particles. Where applicable, centrifuges may be employed to separate the polymer from the liquid phase, as a paste, or powder. Use of a "frothing chamber" may be employed, where the material is to be recovered as a paste of foamed polymer, or added to the head-box of a paper-making machine, to produce novel products. The frothing chamber, receiving the preheated and pressurized emulsion from the fluid extruder section of the process, enables the liquid to be decompressed to atmospheric pressure, permitting foaming of the particles to take place. The foamed particles being of low density, will float to the surface of the chamber, where they may be removed by a filter drum, as a froth, or paste. As a modification of the removal system, a porus substrate, in the form of a web of paper, or cloth, may be made to pass over the filter drum, so that the froth can be effectively coated onto the substrate, where it may subsequently be processed, to yield a laminate of substrate and low density foamed material. Where the polymer is heat sensitive and may not be conveniently spray-foamed in a spray dryer, the material may be foamed in a frothing chamber, as described above and separated from the liquid phase at temperatures below the softening range of the polymer in a spray dryer, operating at reduced temperatures and pressures. The foamed polymer particles from the frothing chamber may, instead of being processed in a spray dryer, be subjected to the action of a centrifuge to separate the polymer particles from the liquid phase.

Although the present disclosure illustrates the use of copolymers containing butadiene and comonomers as the elastomeric material in the core of the double shelled foamable polymers, it is to be understood that other elastomers may be utilized, in conjunction with compatible thermoplastic materials in the inner and outer shells. Ethylene/propylene elastomers may be utilized as core material, in conjunction with polyolefins as inner and outer shell materials. Similarly, fluorocarbon elastomers may be used as core material with fluorocarbon polymers as the inner and outer shells. Internally plasticized vinyl, in which is incorporated a gelled volatile liquid hydrocarbon blowing agent, as well as specially formulated vinyl organosols, may be used as the core material, around which is polymerized additional vinyl plastics, to produce double shelled foamable powders, having desirable physical and chemical properties. Useful double shelled foamable polymers may be obtained by selection of one of the elastomer systems above-mentioned, with one of the thermoplastics systems above-mentioned, whether compatible or incompatible, using gelled volatile liquid hydrocarbons, dispersed within the core system, whether the volatile liquid is a solvent or nonsolvent for the elastomer employed. Preferentially, the liquid blowing agent should be a non-solvent for the inner and outer shell material, but normally solvent liquids, when suitable gelled by combinations of Aluminum Isopropoxide and a low molecular weight oxidized polyethylene containing traces of adlehydes and ketones, as disclosed in the co-pending application, mentioned above, may be dispersed within the core material, to produce useful foamed products, when processed according to the embodiments of the present invention.

Although batch polymerization may be achieved in a single kettle, it will be advantageous where equipment is available, to produce the core zone recipes in a smaller kettle, adding the material, when reacted to the desired degree of completion, to a larger kettle containing the inner zone recipe. The outer zone recipe may then be added to the kettle, when the inner zone has been polymerized to the desired degree. The finished polymer may be separated from the liquid medium by conventional means, or further processed to produce foamed or foamable powders, according to the teachings of the co-pending application Ser. No. 225,829.

A semi-continuous process may be utilized, where the inner zone formulation, polymerized to the desired degree of conversion is blended continuously with the outer zone recipe, in suitable proportions, and subjected to the required processing conditions in a continuous reactor, similar to that disclosed in the patent of Lawson, USP 1,867,014.

Using three separate continuous reactors in series, the entire process can be carried out continuously where the processing times and conditions in each reactor are adapted to the requirements of the recipes employed for the core zone, the inner zone, and the outer shell zone.

While the invention has been described with reference to particular embodiments thereof, it will be understood that in its broadest aspects, the invention may be varied within the scope of the invention as set forth therein, and in the appended claims.

It is to be understood that although a preferred embodiment of the invention provides that the frothing chamber be utilized to allow the foamable particles to be collected as discrete particles, it is possible to break the emulsion or suspension, and utilize the frothing chamber at temperatures above the fusion point of the polymer particles, so that the froth will be made to coalesce as a foamed gel or pastelike material, whereupon it may be coated directly onto paper or textiles, used as a filter medium. In this manner, laminates of foamed, low density material and substrates may be readily produced.

What is claimed is:

1. Foamable plastic powder, substantially each of the particles of which comprise a core consisting essentially of gelled blowing agent material, a first relatively non-polar shell enveloping said core and consisting essentially of first thermoplastic resin material, and a second shell enveloping said first shell and consisting essentially of second thermoplastic material more responsive to radio frequency heating than said first thermoplastic resin material.

2. Foamable plastic powder according to claim 1, wherein said second thermoplastic resin material softens at a higher temperature than said first thermoplastic resin material.

3. Foamable powder according to claim 2, wherein said blowing agent material consists essentially of volatile liquid blowing agent material and gelling material.

4. A foamable resin particle comprising a core consisting essentially of elastomeric resin material and a volatile liquid hydrocarbon material, a relatively low polarity inner shell consisting essentially of the thermoplastic resin material enveloping said core, and an outer shell consisting essentially of thermoplastic resin material enveloping said inner shell and having greater polarity than the inner shell material, said outer shell being composed mainly of resin formed by polymerization of monomer selected from the group consisting of acrylonitrile and the combination of styrene and para-chloro-alpha methyl styrene, styrene and chloro-ethylene, styrene and methacrylonitrile, and styrene and chlorinated styrene.

References Cited
UNITED STATES PATENTS

| | | | |
|---|---|---|---|
| 2,908,602 | 10/1959 | Collardeau et al. | 117—72 X |
| 2,962,456 | 11/1960 | Carlson | 260—2.5 |
| 2,983,692 | 5/1961 | D'Alelio | 260—2.5 |
| 2,989,782 | 6/1961 | Barkhuff et al. | 117—100 X |
| 3,010,157 | 11/1961 | Cizek | 219—10.41 X |
| 3,057,751 | 10/1962 | Nagle | 117—100 |
| 3,086,885 | 4/1963 | Jahn | 117—100 |
| 3,138,478 | 6/1964 | Hedman et al. | 117—100 X |
| 3,154,604 | 10/1964 | McMillan | 117—100 X |
| 3,166,612 | 1/1965 | Sauer et al. | 264—7 X |
| 3,223,518 | 12/1965 | Hansen | 117—100 |

WILLIAM D. MARTIN, *Primary Examiner.*

R. HUSACK, *Assistant Examiner.*